Nov. 2, 1948.   I. COWLES   2,452,908
DETACHABLE HOSE COUPLING
Filed June 21, 1946
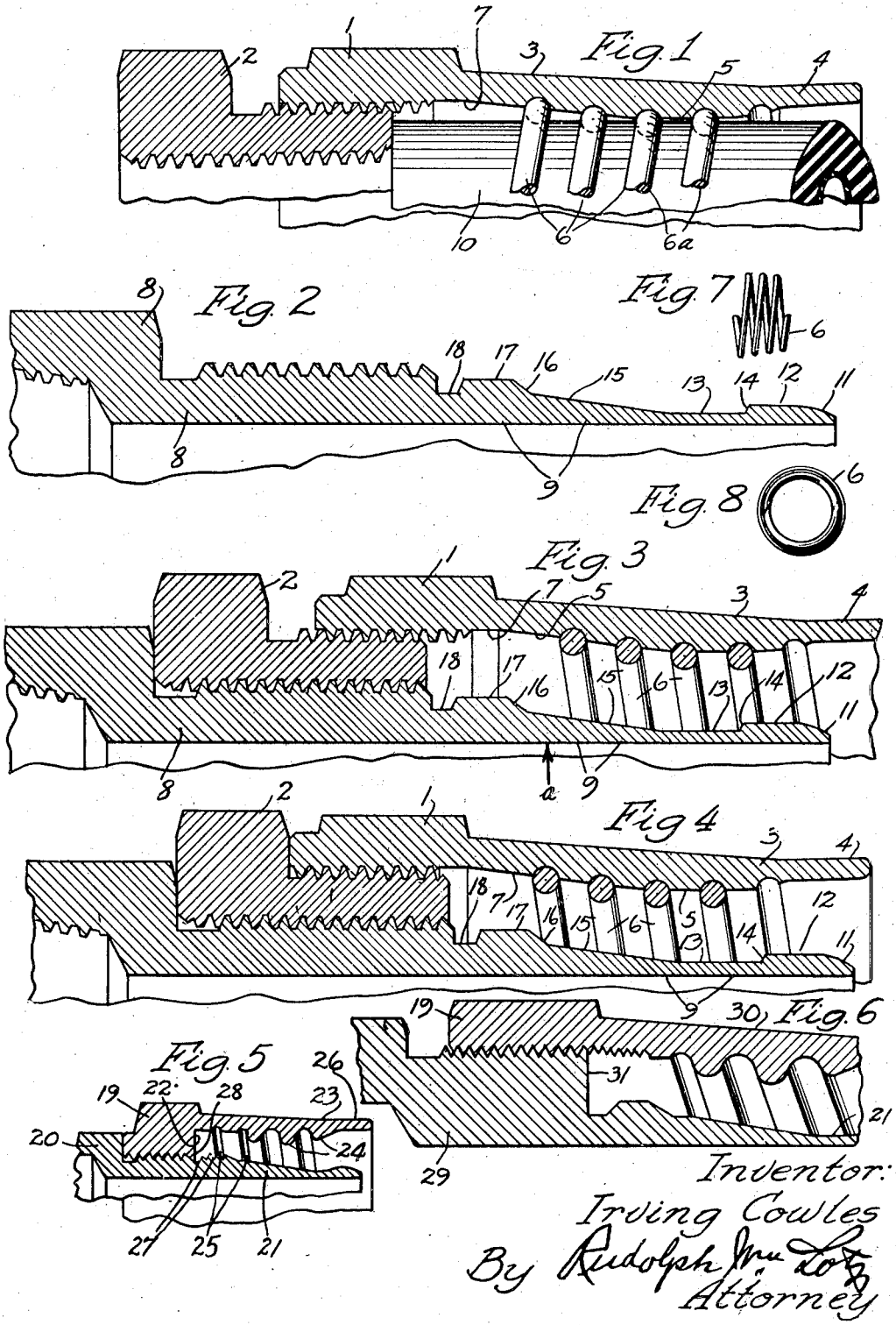
Inventor:
Irving Cowles
By Rudolph Mu Lot
Attorney Patented Nov. 2, 1948

2,452,908

UNITED STATES PATENT OFFICE 2,452,908

DETACHABLE HOSE COUPLING

Irving Cowles, Chicago, Ill.

Application June 21, 1946, Serial No. 678,466

7 Claims. (Cl. 285—86)

This invention relates to improvements in Detachable hose couplings and has for its main and general object to provide a simple, cheap, durable and efficient structure of this type adapted for use in the production of flexible conduits for all fluids and all pressure conditions and which may be attached to and detached from the hose without the use of any tools other than conventional wrenches or a vise and wrench, if a vise is handy.

Further and more specific objects of the invention are:

First, to provide a coupling which will accommodate hose of both larger and smaller outer and inner acceptable tolerance diameters, within reasonable limits, than those specific tolerances which determine the rejections of hose of all sizes.

It is commonly known that hose cannot be produced with respect to more than average diametric dimensions; that the ducts of hose are rarely absolutely concentric with the outer surface, and that hose which exceeds the limits of specified tolerance diameters is not rendered less pressure resistant than that which meets tolerance limitations and that a coupling which permits the use of such rejectable hose, operates to decrease waste and thus operates also to decrease the cost of hose. The high pressure types of the latter are very expensive and in determining production cost, the manufacturer is obliged to figure on a fairly liberal percentage of rejections of the product in order to avoid loss in place of gaining profit.

Hose is usually made in fifty foot lengths wherein there may be no two successive feet diametrically alike or of tolerance dimensions lying within the specified limits. The manufacturer sells only full fifty foot lengths and the customer returns those portions of each length that are rejectable as pointed out above, and, obviously, a coupling that is adapted to meet a greater range of tolerances than specified, is profitable to both the manufacturer and consumer.

Second, a further object is to provide a coupling of given weight and dimensions which is so constructed that it may be applied with equal facility to low and high pressure hose without change, and which will withstand the maximum pull test directed to determine the force required to withdraw the hose from the coupling, and will withstand the maximum pressure resistant stress to determine resistance to leakage which usually causes the fluid to force its way into the outer casing of the hose as opposed to the inner tube thereof and thus acts to destroy the hose or render it useless and cause its immediate rejection.

With respect to such pull test, attention is directed to the fact that it is not difficult, generally, to produce hose couplings which will seal a flexible conduit against leakage under the maximum fluid pressure which test requirements specify, but to also withstand the specified pull test presents another problem to be solved and which is solved in the couplings of this invention without effecting any increase in its overall outer dimensions.

There are also types of low pressure hose which elongate appreciably under tension and such elongation effects reduction in thickness of the hose wall.

Hose of this type is far more difficult to hold in the coupling against withdrawal under the pull test than any other type but the coupling of this invention will hold the same.

Third, it is necessary to, and a further object of the invention is to meet the requirement that the coupling shall not injure the outer surface or jacket of the hose nor the inner tube thereof otherwise than along a very small portion of the outermost end portion of the hose as by providing the stem of the coupling with sharp threads or other sharp edges which operate to cut into the said inner tube.

In the accompanying drawings, illustrating suitable embodiments of the invention:

Fig. 1 is a fragmentary central radial section of three interengaged parts of a coupling constructed in accordance with the invention and showing a hose end portion inserted into the same, all in their initial relative positions, with the stem element omitted.

Fig. 2 is a view similar to Fig. 1 of the stem element of the coupling.

Fig. 3 is a view similar to Fig. 1, the hose end portion being omitted, showing the stem element of Fig. 2 disposed at the inner limit of its movement as determined by the sleeve nut of Fig. 1.

Fig. 4 is a view similar to Figs. 1 and 3, showing the sleeve nut and stem element disposed at the ultimate inner limits of their movement with respect to the shell of the coupling, the hose end portion being omitted.

Fig. 5 is a view similar to Fig. 4 illustrating a modified form of embodiment of the invention.

Fig. 6 is a view similar to Fig. 5 showing another embodiment of the invention.

Fig. 7 is a side elevation on a reduced scale of a thread forming spring embodied in the structure shown in Figs. 1, 2 and 3.

Fig. 8 is an end view of the spring shown in Fig. 7.

In its preferred form, the coupling comprises the shell member 1 equipped with a central threaded opening which receives the sleeve nut 2.

The skirt portion 3 of the member 1 is tapered slightly from substantially its junction with the nut portion 1 to its mouth portion 4. The latter is flared to the degree that its mouth is of inner diameter sufficient to receive a hose end of larger diameter than the greatest specified plus-tolerance allowance applicable to hose of the size which the coupling is designed to receive.

As such tolerances are expressed in thousandths of an inch, this mouth diameter of the shell is sufficient to receive a hose end portion having diameter equal to the standard specified diameter plus double the plus-tolerance allowance.

Thus, if the said tolerance allowance is fifteen thousandths of an inch, the mouth of the shell will allow for a tolerance of thirty thousandths of an inch.

The inner flared surface of the said mouth portion meets the curved convergent annular shoulder of the thicker wall portion 5 of the shell 3, which is equipped with a long pitch shallow helical groove which is of depth less than one-half and preferably about equal to one-third the diameter of the wire of which the helical spring 6 engaged in said groove is composed.

The said spring 6, which is normally purely helical, as shown in Fig. 1, is contracted to greatest degree between its ends as shown by the coils 6a thereof, said spring being rendered spiro helical when engaged in said groove of said wall portion 5.

The terminal ends of the spring 6 are beveled, as shown in Fig. 8, the sharp ends thereof being disposed in the bottom of the groove of the shell 3 when said spring 6 is engaged in same.

The pitch of said groove and of the spring 6 engaged therein, is such that the space between the convolutions of said spring is of greater width than the diameter of the wire of which said spring is composed. The latter thus constitutes the equivalent of a very deep thread which is very difficult to produce in a thread cutting operation. It also provides only rounded, smooth surfaces which will not cut into or otherwise injure the hose. The terminals of said spring are beveled so that the sharp ends thereof lie in the bottom of the helical groove while their surfaces form leads into the thread, hereinafter referred to as the thread 6 of the shell, the said spring being frictionally held rigid with said shell by its contraction.

This thicker grooved wall portion of the shell is flared along its inner end portion to its meeting point with the internally cylindrical portion 7 of said shell next adjacent to thread thereof.

In the instance illustrated, said helical groove is arcuate and of radius equal to that of the wire of the spring but is not necessarily of that particular size and contour but may be of the same shape as the wire receiving groove of the shell of the coupling shown in the drawings of the Cowles Patent No. 2,121,624.

The sleeve nut 2 is interposed between the shell member 1 and the body portion 8 of the stem 9 of the coupling. The contour of said stem 9, which has a cylindrical bore of diameter substantially equal to that of the hose 10, is designed necessarily to cooperate with inner contour of the shell 3 to vary the width of the annular space between said stem and shell to produce the results set forth in the foregoing statement of the objects of the invention.

By reference to Fig. 4, it will be noted that when the sleeve nut 2 and the stem member 9 are disposed at the inner limits of their movement relative to the shell member 1, the stem 9 projects almost to the mouth of the portion 4 of the shell 3 and is equipped with a rounded terminal shoulder 11, constituting a terminal of the short cylindrical portion 12 which is of appreciably greater diameter than the next inward cylindrical portion 13 and is bordered by a rounded shoulder 14.

Said cylindrical portion 12 is opposed to substantially the smallest diameter portion of the thread 6, the shoulder 14 being spaced inwardly of said mouth portion 4. The cylindrical portion 13 joins the next inward frusto conical stem portion 15 in a plane perpendicular to the stem axis disposed slightly less than halfway between the shoulder 14 and the inner end of said portion 15. The latter terminates in a tapered shoulder 16 bordering the largest diameter cylindrical shoulder 17 of said stem and which is of the largest diameter possible to pass through the sleeve nut 2, said portion 17 opposed to that portion of the shell 3 lying between the cylindrical portion 7 and the thread 6.

The said portion 17 is bordered by the annular recess 18 which also borders the thread of the stem member 8.

The annular space between the stem 9 and the surface portion 5 of the shell 3 is of the greatest width and is substantially arcuate in radial longitudinal section. The thread 6 projects into the said space to the extent of substantially one-fifth thereof and presents the equivalent of a helical shoulder, at its inner end, which is opposed to the sleeve nut 2.

The threads of the sleeve nut 8 are right hand, while the thread 6 is left hand, in all instances.

In applying the coupling to the end portion of a hose 10, shown in Fig. 1, the stem member is absent and the sleeve nut 2 is positioned outwardly of the inner limit of its movement a distance which is determined by the type of hose 10 used. If the latter is of a relatively hard compact type, the nut 2 may be backed out a distance equal to the length of two or three of its outer threads. If such hose is of more yielding nature, said distance is increased.

The inner end of the nut 2 constitutes a stop for the inner end of the hose 10 as shown in Fig. 1, and while the hose 10 remains in its last-named position, the stem 9 is inserted into the duct or inner tube of the same with ease, a lubricant, such as glycerine being used, until the threads of the stem member meet the inner threads of the sleeve nut 2. This occurs when the extremity of the stem has attained the position indicated by the arrow A in Fig. 3.

Insertion of the stem to this point effects an appreciable degree of expansion of the hose and occasions only a slight degree of ejection force upon the hose, insufficient to overcome the resistance of the threads 6 to such ejection.

During the remainder of the stem insertion operation which is effected while the stem member 8 is rotated until the latter and said sleeve nut 2 have attained the limits of their movement, shown in Fig. 4, the expansion of the hose 10 causes the helical space between the thread 6 to be filled completely, while the innermost end portion of the hose is not only expanded to greater degree than the portion thereof disposed within the zone of the thread 6 but is also subjected to the end-thrust of the nut 2 which effects such a high degree of compaction of the hose within the innermost portion or chamber of the shell 3, as to cause the annular recess 18 to be filled very compactly, and this compaction force extends in the annular space occupied by the thread 6 to increase hose wall compaction within the same.

As soon as the stem member has attained the position of Fig. 3, the shell member must be engaged in a vise or wrench and a wrench applied to the stem member, obviously, until assembly of the coupling with the hose has been completed.

All of the aforesaid compaction operates to compress the inner tube of the hose to such degree against the stem 9 that no leakage or seepage of fluid can occur around said stem.

The compaction referred to extends to the shoulder 15 of the stem to a progressively decreased degree.

Upon completion of the assembly, the hose will withstand easily the maximum pull test applied, which is always limited to a given number of pounds of pull determined by the nature of the hose, as to structure, and fluid pressure resistant requirements of the same.

In instances wherein the hose is oversize as to outer diameter, the initial position of the sleeve nut 2, shown in Figs. 1 and 3, is farther inward, but in instances where the hose is of specified or less than specified outer diameter, said sleeve nut is positioned initially farther outwardly than otherwise, thus to assure a sufficient degree of the compaction aforesaid to meet the said pull and leakage and seepage requirements.

The hose 10 is not shown in Figs. 3 and 4 because it is believed that this is unnecessary in view of the complete foregoing description of what occurs during the conduit assembly operations.

The structure of Fig. 5 differs from that of Figs. 3 and 4, mainly in the omission of the sleeve nut 2 of the latter, and is intended for application mainly to very soft wall hose of low pressure type which is usually elongatable and, therefore, also capable of being shortened by forcing its extremity against a stop shoulder.

Such initial shortening of soft wall hose effects lateral displacement of hose wall material sufficiently to practically fill free space between the stem and the shell in the innermost portion of the latter.

In the structure of Fig. 5, the body portion 19 of the shell member is equipped with a central threaded aperture to receive the threaded body portion 20 of the stem 21, and presents an annular stop shoulder 22 of about the same area as the inner end of the sleeve nut 2 of Figs. 1, 3 and 4.

The skirt portion 23 of the shell member is substantially similar to the skirt portion 3 of said Figs. 1, 3 and 4, except that the left-hand thread formation 24 thereof is integral with the skirt portion 23. The portion of the skirt 23 lying inwardly of the thread formation 24 is cylindrical and is equipped with a relatively shallow left-hand thread formation 25, the latter being of greater root diameter than the thread 24.

The wire type thread 6 of Figs. 1, 3, and 4 may be substituted for the thread 24.

Said skirt 23 is also tapered slightly externally to its mouth portion 26 which is identical with the mouth portion 4 of Figs. 1, 3 and 4.

The contour of the stem 21 is very similar to that of the stem 9 except that its innermost portion 27, corresponding with the portion 17 of the stem of Figs. 2, 3 and 4, is equipped with a continuation of the thread of the body portion 20 beyond the annular recess 28.

In applying this structure to the hose, the latter is first inserted to engage the stop shoulder 22. The stem 21 may then be inserted into the end of the hose along only the smaller diameter portion of said stem to prevent contraction of this portion of the hose duct before the hose is further rotated anti-clockwise to effect the crowding of more of it into the innermost portion of the shell.

The thread of the portion 28 of the stem 21 operates to resist the tendency of the hose to back out of the skirt portion during the further stem inserting operation, which is effected easily with the aid of previously applied glycerine, until the threads of the stem member and shell member become interengaged. Further insertion of the stem is effected by rotation of the latter relative to the member 19. This occurs sooner than in the structure of Figs. 1 and 3 because of the greater length of the thread of the member 19.

Soft wall hose yields more readily to expansion responsively to internal fluid pressure than hard wall hose, and for that reason the threads of the shoulder or portion 27 of the stem are required to effect greater compaction of the inner end portion of the inner tube of the hose, than is required in the case of hard wall hose, to prevent leakage or seepage which must follow the thread to occur and overcome the greater resistance afforded along the said last-named thread portion.

Soft wall hose is usually of shorter life than the harder type, and, having been used for a given period of time, it is replaced, being seldom used until it bursts.

The structure illustrated in Fig. 6 differs from that shown in Figs. 3, 4 and 5 only in that the stem 21 is integral with a body member 29 of greater length and diameter than the body member 20 of Fig. 5, to engage in the larger diameter internal thread of the shell 30, the diameter of the shell thread being equal to the greatest inner diameter of said shell.

The inner surface of the said stem member 29 presents an annular shoulder 31 which takes the place of the end wall of the structure of Fig. 5 and of the sleeve nut 2 of Figs. 1, 3 and 4, it being obvious that said stem member of Fig. 6, when removed, permits a greater length of hose to be inserted into the shell into overlapping relation to the threads of the latter to any desired degree than is true of Fig. 5, as, for example, so that the inner extremity of the hose attains the plane of the said inner surface or shoulder of the body member 29 of the stem, as shown in Fig. 6, before the latter is inserted into the hose to the depth required before the threads of the shell and stem members become interengaged.

Thereafter the stem member is rotated until it has attained the inner limit of its movement.

Hose wall material in the innermost chamber of the shell is thus displaced to fill compactly all free space in said chamber, as results also from operation of the sleeve nut 2 of Figs. 3 and 4, as described hereinabove.

In all instances, the shell member of the coupling is cylindrical internally initially, and is subjected to the well-known swaging operation, after insertion of the spring 6 of Figs. 1, 2 and 4, and after forming the threads of Fig. 5.

The depths of the threads in all instances is of major importance, because they are required to be of depth equal to a fairly large fraction of the width of the annular space between the stem and shell of the coupling, being approximately equal to one-fifth of the said width within the length of said thread excluding the lead portions of the same.

The width of the portion or zone occupied of annular space occupied by said thread is substantially uniform.

The depth of the thread is open to some degree of variation to meet the variations in the type of hose used, but should not be less than approximately one-sixth of the width of the annular space between the stem and the said thread and, in some cases, it may exceed one-fifth of said width.

The pitch of said thread 6 or 25 must be such that the hollow thereof is no less than equal in width to the pitch thickness of the solid thereof, a greater width of hollow than such solid, as in Figs. 1, 3 and 4, being preferable.

I claim as my invention:

1. A coupling including a shell equipped with a mouth portion bordering an inner threaded wall portion of said shell of inner diameter intermediate of its end portions appreciably smaller than the smallest diameter portion of said mouth portion, said thread being spirohelical and of greatest diameter at its inner end, said thread being spaced from the inner end of said shell, an axial stem having a frusto-conical outer surface portion opposed to and cooperating with said threaded wall portion of said shell to provide an annular space of progressively increasing diameter from its outer to its inner end, the greatest diameter portion of said stem being opposed and cooperating with the greatest inner diameter portion of said shell to provide an inner chamber having an outer wall surface of length approximately equal to or greater than a complete turn of said thread, the depth of the latter being equal approximately to one-fifth of the annular space between said surface and the said stem and presenting an arcuate crown throughout substantially its entire length.

2. A coupling, according to claim 1, wherein the thread formation of the shell is spiro helical along its inner end portion and wherein the stem is equipped with a frusto conical outer surface portion opposed to said thread, and with a substantially cylindrical portion of diameter greater than the largest diameter part of said first-named portion of said stem at the inner end portion of the latter, there being an annular recess in the innermost portion of said stem opposed to the largest inner diameter portion of said shell in the inner end of said chamber with the plane of said recess spaced from the plane of the outer end of said cylindrical portion of said stem, the last-named plane defining the outer end of said annular chamber.

3. A hose coupling including a shell member equipped with a tapered shell including a contracted mouth portion and equipped internally with a deep, long pitch thread formation extending from said mouth portion to a point spaced from its innermost end, said thread formation being of maximum diametric dimensions along its innermost end portion, an axial stem member presenting a progressively smaller diameter outer surface portion between its ends opposed to said thread formation from the greatest to the smallest diameter portion of the latter and spaced therefrom a distance less than the thickness of the wall of a hose to be received in the resulting annular space, and a sleeve nut interposed between and having thread engagement with both said shell member and said stem member and operable to increase and decrease the length of the said space.

4. A hose coupling including a shell and a stem concentric with and spaced from each other, said shell equipped internally, between its ends, with a deep long pitch thread, the root of the latter being spaced from said stem radially a distance substantially equal to the outer diameter of a hose to be received within said annular space, the outer diametric dimensions of said stem being greater than that of hose-duct, and a member disposed to form the inner end wall of the annular space between said shell and said stem and adjustable relative to both thereof for increasing and decreasing the length of said annular space.

5. A structure, as defined in claim 4, wherein the said annular space between the threaded portion of the shell and the portion of said stem opposed thereto is of progressive increased diametric dimensions from its outer to its inner ends, and wherein the innermost end portion of said thread formation is spaced from said adjustable member at all times a distance no less than substantially equal to the radial width of said annular space.

6. A structure, according to claim 4, wherein the shell terminates in a mouth portion of inner diameter greater than the smallest diameter portion of said shell for determining the maximum outer diameter of hose to be inserted into said shell, and wherein the thread formation of said shell is of greater root diameter at its outermost end portion than between its ends and is of greatest root diameter at its innermost end, and wherein the stem projects into the said mouth portion and is of smallest outer diameter between said portion of said stem projecting into said mouth portion and that portion of said stem opposed to a progressively increased root diameter portion of said thread formation, said smallest diameter portion of said stem being opposed to the smallest root portion of said thread formation.

7. A hose coupling comprising a shell member and a stem member movable longitudinally relative to each other, said shell member equipped with an internal thread formation between its ends spaced from said stem member to provide an annular space between said members of maximum width radially to equal substantially the outer diameter of the hose to be received in said annular space, said members being associated against relative lateral movement, and means included in said association thereof whereby the length of said annular space may be increased or decreased at will before the stem member attains the inner limit of its movement relative to the shell member.

IRVING COWLES.

REFERENCES CITED

The following references are of record in the file of this patent:

UNITED STATES PATENTS

| Number | Name | Date |
|---|---|---|
| 852,237 | Nielsen | Apr. 30, 1907 |
| 1,235,876 | Cave | Aug. 7, 1917 |
| 2,121,624 | Cowles | June 21, 1938 |
| 2,171,945 | Norgren | Sept. 5, 1939 |
| 2,394,632 | Parker | Feb. 12, 1946 |